(12) United States Patent
Rigoni et al.

(10) Patent No.: US 11,055,165 B2
(45) Date of Patent: Jul. 6, 2021

(54) SHADOW MEMORY CHECKING

(71) Applicant: Allegro MicroSystems, LLC, Manchester, NH (US)

(72) Inventors: Nicolas Rigoni, Buenos Aires (AR); Fernando Orge, Buenos Aires (AR); Lucas Intile, Buenos Aires (AR); Nicolás Rafael Biberidis, Barcelona (ES); Leandro Tozzi, Buenos Aires (AR)

(73) Assignee: Allegro MicroSystems, LLC, Manchester, NH (US)

( * ) Notice: Subject to any disclaimer, the term of this patent is extended or adjusted under 35 U.S.C. 154(b) by 94 days.

(21) Appl. No.: 16/695,968

(22) Filed: Nov. 26, 2019

(65) Prior Publication Data

US 2021/0157669 A1 May 27, 2021

(51) Int. Cl.
| | | |
|---|---|---|
| *G06F 11/00* | (2006.01) | |
| *G06F 11/07* | (2006.01) | |
| *G06F 11/16* | (2006.01) | |
| *G06F 11/10* | (2006.01) | |
| *G06F 9/54* | (2006.01) | |
| *G06F 13/16* | (2006.01) | |
| *G06F 9/30* | (2018.01) | |
| *G06F 11/30* | (2006.01) | |

(52) U.S. Cl.
CPC ...... *G06F 11/0772* (2013.01); *G06F 9/30134* (2013.01); *G06F 9/546* (2013.01); *G06F 11/1068* (2013.01); *G06F 11/167* (2013.01); *G06F 11/3037* (2013.01); *G06F 13/1668* (2013.01)

(58) Field of Classification Search
CPC .. G06F 11/2094; G06F 11/0772; G06F 21/64; G06F 11/1629; G06F 11/167
See application file for complete search history.

(56) References Cited

U.S. PATENT DOCUMENTS 8,736,260 B2 5/2014 Foletto et al.
9,395,391 B2 7/2016 Fernandez et al.
(Continued)

OTHER PUBLICATIONS

U.S. Appl. No. 16/822,119, dated Mar. 18, 2020, Sarwar et al.
U.S. Appl. No. 16/782,139, dated Feb. 5, 2020, Sarwar et al.

*Primary Examiner* — Charles Ehne
(74) *Attorney, Agent, or Firm* — Daly, Crowley, Mofford & Durkee, LLP

(57) ABSTRACT

In one aspect, an integrated circuit (IC) includes a multiplexor configured to receive data from a non-volatile memory and configured to receive data from a shadow memory, a shift register configured to generate a first signature from the data received from the non-volatile memory and configured to generate a second signature from the data received from the shadow memory; a signature storage configured to store the first signature; and a shadow memory checking controller configured to enable the multiplexor to send the data from the non-volatile memory to the shift register, and send a command to reload the shadow memory with data from the non-volatile memory in response to receiving an error flag. The IC also includes a comparator circuit configured to compare the first signature and the second signature and configured to send the error flag in response to the first signature and the second signature being different.

21 Claims, 3 Drawing Sheets

(56) References Cited

U.S. PATENT DOCUMENTS

| | | |
|---|---|---|
| 10,411,498 B2 | 9/2019 | Shoemaker et al. |
| 10,635,539 B2 | 4/2020 | Cook et al. |
| 2006/0129370 A1* | 6/2006 | Unger ................ G06F 13/4045 703/20 |
| 2007/0168718 A1* | 7/2007 | Reblewski ....... H03K 19/17764 714/15 |
| 2010/0052424 A1 | 3/2010 | Taylor et al. |
| 2010/0169740 A1* | 7/2010 | Jagasivamani .... G11C 13/0004 714/763 |
| 2018/0267868 A1* | 9/2018 | Bose ................... G06F 11/1629 |
| 2020/0020412 A1 | 1/2020 | Biberidis et al. |

* cited by examiner

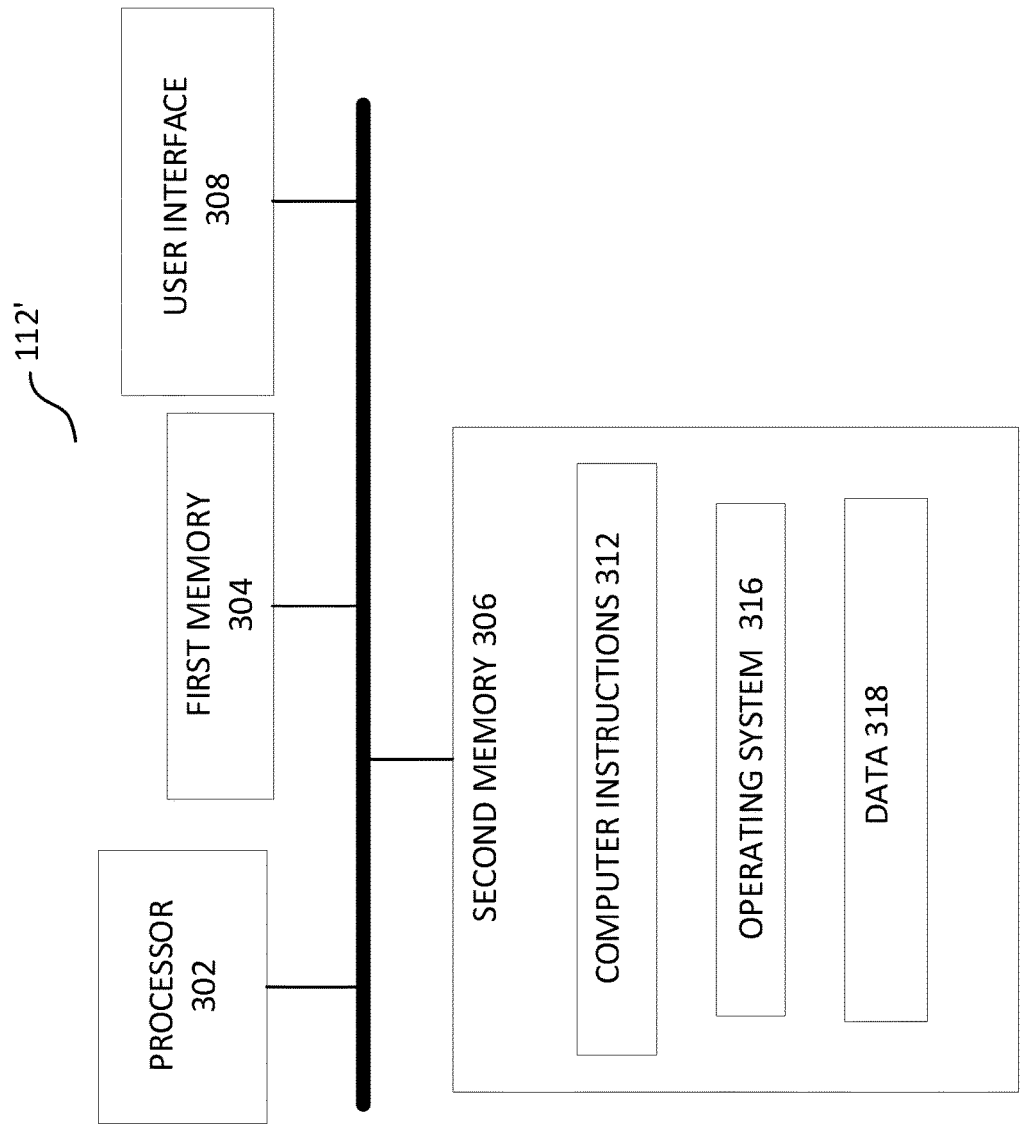

SHADOW MEMORY CHECKING

BACKGROUND

A shadow memory is typically used to store data from a primary source that is used often and needs to be accessed quickly. Usually, shadow memory is a volatile memory. Generally, it is important that the data in the shadow memory be valid (i.e. the same as the primary source). The validity of the data in the shadow memory may be checked using a parity checker.

SUMMARY

In one aspect, an integrated circuit (IC) includes a multiplexor configured to receive data from a non-volatile memory and configured to receive data from a shadow memory. The shadow memory mirrors the non-volatile memory. The IC also includes a shift register configured to generate a first signature from the data received from the non-volatile memory and configured to generate a second signature from the data received from the shadow memory; a signature storage configured to store the first signature; and a shadow memory checking controller configured to enable the multiplexor to send the data from the non-volatile memory to the shift register, and send a command to reload the shadow memory with data from the non-volatile memory in response to receiving an error flag. The IC further includes a comparator circuit configured to compare the first signature and the second signature and configured to send the error flag in response to the first signature and the second signature being different.

In another aspect, a method includes receiving data from a non-volatile memory; determining a first signature of the received data from the non-volatile memory; storing the first signature; receiving data from a shadow memory, wherein the shadow memory mirrors the non-volatile memory; determining a second signature from the received data from the shadow memory; comparing the first signature to the second signature; and sending at least one of an error message or a command to reload the shadow memory with data from the non-volatile memory in response to the first signature and the second signature being different.

In a further aspect, an article includes a processor and a non-transitory machine-readable medium that stores executable instructions. The instructions cause the processor to receive data from a non-volatile memory; determine a first signature of the received data from the non-volatile memory; store the first signature; receive data from a shadow memory, wherein the shadow memory mirrors the non-volatile memory determine a second signature from the received data from the shadow memory; compare the first signature to the second signature; and send at least one of an error message or a command to reload the shadow memory with data from the non-volatile memory in response to the first signature and the second signature being different.

DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

FIG. 3 is a block diagram of an example of a shadow memory checking module on which the process of FIG. 2 may be implemented.

DETAIL DESCRIPTION

Described herein are techniques to check a shadow memory to determine if the data in the shadow memory is still correct. The techniques described herein have a high fault detection coverage compared to conventional approaches that use a parity checker. The high fault detection coverage provided by these techniques allow for products to be implemented in systems with performance-based safety requirements such as automotive (as per ISO 26262, for example) or aerospace systems. In one particular example, the techniques described herein may be realized in a sensor disposed in automobile circuitry such as optical sensors, microelectromechanical systems (MEMS) sensors, magnetic sensors, pressure sensors, chemical sensors, accelerometer sensors, gyroscope sensors, temperature sensors, humidity sensors and so forth.

Figure 1:
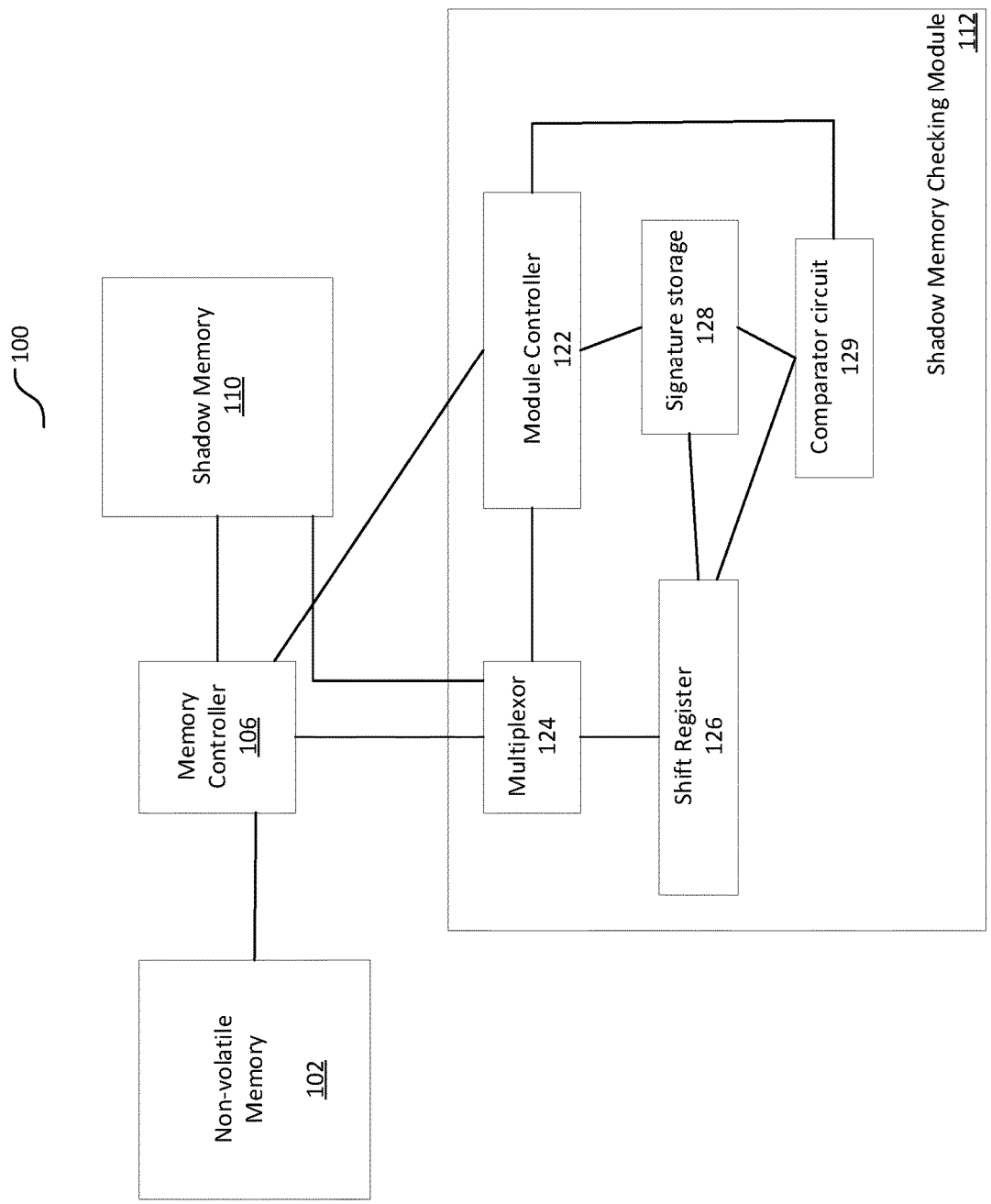
FIG. 1 is a block diagram of an example of a system to perform shadow memory checking.

Referring to FIG. 1, an example of a system to perform shadow memory checking is a system 100. In one example, the system 100 is part of an integrated circuit (IC). The system 100 includes a non-volatile memory 102, a memory controller 106, a shadow memory 110 and a shadow memory checking module 112. The shadow memory checking module 112 includes a module controller 122, a multiplexor 124, a shift register 126, as signature storage 128 and a comparator circuit 129.

In one example, the shadow memory 110 is volatile memory. In one example, the non-volatile memory 102 is an electrically erasable programmable read-only memory (EEPROM). In another example, the non-volatile memory 102 is a flash memory. In one example, the shift register 126 is a multiple input shift register (MISR).

The memory controller 106 stores data from the non-volatile memory 102 to the shadow memory 110. In one example, the memory controller 106 loads data from the non-volatile memory 102 to the shadow memory 110 in response to the IC being powered up. In other examples, the memory controller 106 loads data from the non-volatile memory 102 to the shadow memory 110 in response to receiving a command. In one example, the data includes sensor trimming including offset and gain adjustment, and/or configuration data. In other examples, the shadow memory 110 may be used to store data for: oscillator trimming to ensure proper clocking; bandwidth selection and frequency response adjustment of digital filters, fault masking to enable/disable errors' notification, selection of communication protocols and so forth.

Figure 2:
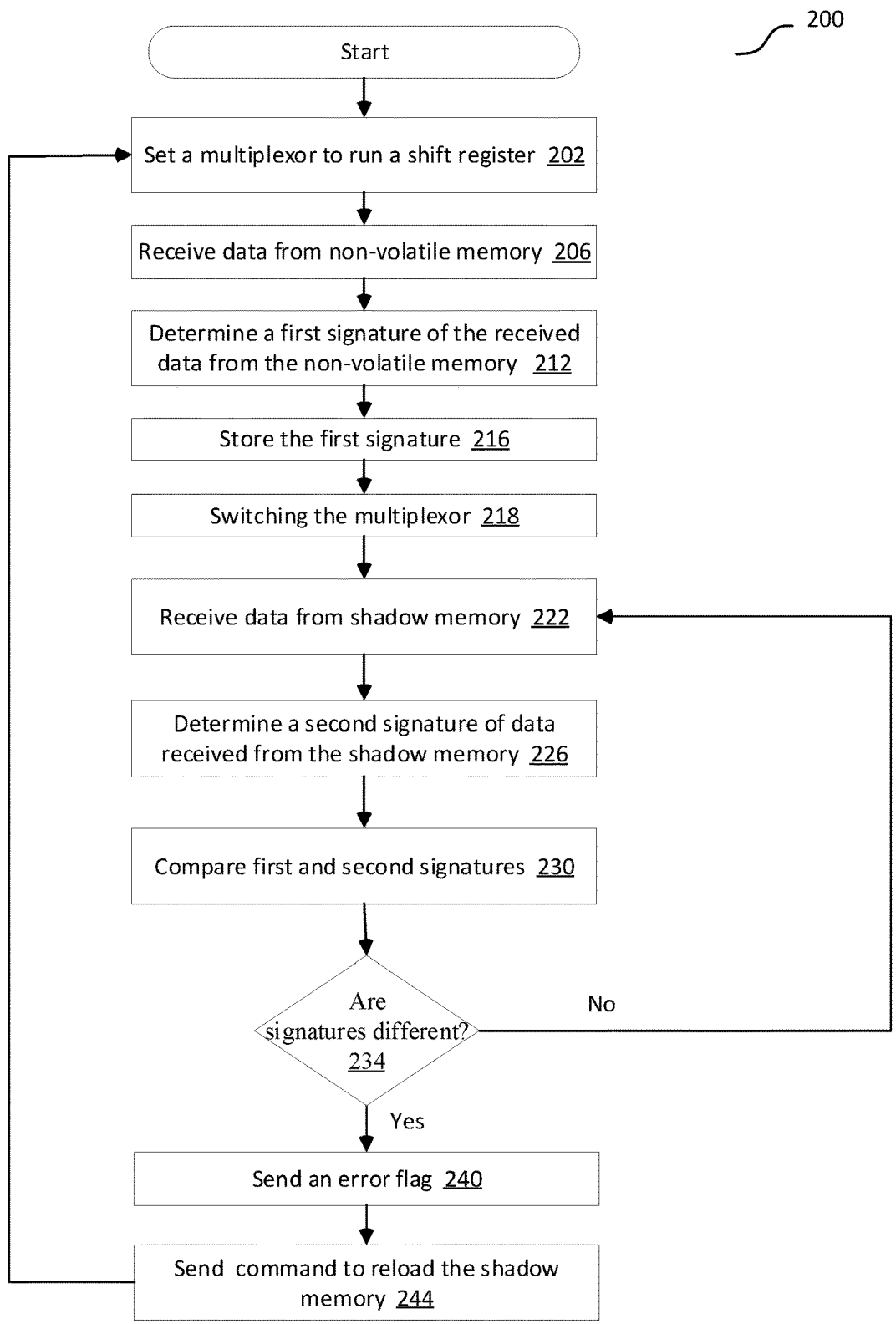
FIG. 2 is a flowchart of an example of a process to perform shadow memory checking.

Referring to FIG. 2, an example of a process to perform shadow memory checking is a process 200. In one example, the process 200 is performed by the shadow memory checking module 112.

Process 200 sets a multiplexor to run a shift register (202). For example, the module controller 122 sets the multiplexor 124 to receive data from the non-volatile memory controller 102 and to send the data to the shift register 126 (FIG. 1).

Process 200 receives data from non-volatile memory (206). For example, the multiplexor 124 takes data from the non-volatile memory 102 sent by the memory controller 106 and sends the data to the shift register 126 (FIG. 1).

Process 200 determines a first signature of the received data from the non-volatile memory (212). For example, the shift register 126 determines a signature of the data received from the non-volatile memory 102 in processing block 202.

Process 200 stores the first signature (216). For example, the shift register 126 stores the first signature in the signature storage 128 (FIG. 1).

Process 200 switches the multiplexor (218). For example, the module controller 122 switches the multiplexor 124 from receiving data from the volatile memory to receiving data from the shadow memory 110 and sending the data to the shift register 126 (FIG. 1).

Process 200 receives data from the shadow memory (222). For example, the multiplexor 124 takes data from the shadow memory 110 and sends the data to the shift register 126 (FIG. 1).

Process 200 determines a second signature of the data received from the shadow memory (226). For example, the shift register 126 determines a signature of the data received from the shadow memory 110 in processing block 222 in a similar fashion as in processing block 212.

Process 200 compares the first and the second signatures (230). For example, the comparator circuit 129 compares the second signature from the shift register 126 with the first signature store in the signature storage 128 (FIG. 1).

Process 200 determines if the first and second signatures are different (234). For example, the comparator circuit 129 determines if the first and second signatures are different (FIG. 1).

If the first and second signatures are the same, processing block returns to processing block 222. In some examples, process 200 waits a period of time before returning to processing block 222, for example, every 100 microseconds.

If the first and the second signatures are different, process 200 sends an error flag (240). For example, the comparator circuit 129 sends an error flag to the module controller 122 (FIG. 1).

Process 200 sends a command to reload the shadow memory (244). For example, in response to receiving an error flag from the comparator circuit 129, the module controller 122 sends a command to the memory controller 106 to reload the shadow memory 110 with data from the non-volatile memory 102 (FIG. 1). Process 200 returns to processing block 202.

In some examples, processing blocks 240 may be eliminated. For example, if the first and second signatures are different, a command may be sent directly from the comparator circuit 129 to the module controller 102 or to the memory controller 106 to reload the shadow memory 110 with data from the non-volatile memory 102 (FIG. 1). In other examples, processing block 244 may be eliminated and only an error message is sent to the module controller 122 or to the memory controller 106 or both.

Referring to FIG. 3, an example of the shadow memory checking module 112 (FIG. 1) is a shadow memory checking module 112'. The shadow memory checking module 112' includes a processor 302, a first memory 304 (e.g., a volatile memory), a second memory 306 (e.g., non-volatile memory such as a hard disk) and the user interface (UI) 308 (e.g., a graphical user interface, a mouse, a keyboard, a display, touch screen and so forth). The second memory 306 stores computer instructions 312, an operating system 316 and data 318. In one example, the computer instructions 312 are executed by the processor 302 out of the first memory 304 to perform all or part of the processes described herein (e.g., process 200).

The processes described herein (e.g., process 200) are not limited to use with the hardware and software of FIG. 3; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 200 is not limited to the specific processing order of FIG. 2, respectively. Rather, any of the processing blocks of FIG. 2 may be re-ordered, combined or removed, performed in parallel or in serial, as necessary, to achieve the results set forth above.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, programmable logic devices or logic gates.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. An integrated circuit (IC) comprising:
   a multiplexor configured to receive data from a non-volatile memory and configured to receive data from a shadow memory, wherein the shadow memory mirrors the non-volatile memory;
   a shift register configured to generate a first signature from the data received from the non-volatile memory and configured to generate a second signature from the data received from the shadow memory;
   a signature storage configured to store the first signature;
   a shadow memory checking controller configured to:
      enable the multiplexor to send the data from the non-volatile memory to the shift register; and
      send a command to reload the shadow memory with data from the non-volatile memory in response to receiving an error flag; and
   a comparator circuit configured to compare the first signature and the second signature and configured to send the error flag in response to the first signature and the second signature being different.

2. The IC of claim 1, wherein the shift register is a multiple input shift register (MISR).

3. The IC of claim 1, wherein the non-volatile memory is an electrically erasable programmable read-only memory (EEPROM).

4. The IC of claim 1, further comprising a memory controller configured to receive the command to reload the shadow memory and to reload the shadow memory with data from the non-volatile memory in response to receiving the command.

5. The IC of claim 1, wherein the shadow memory is volatile memory.

6. The IC of claim 1, wherein the shadow memory checking controller is further configured to enable the multiplexor to switch from sending the data from the non-volatile memory to sending the data from the shadowed memory to the shift register.

7. The IC of claim 1, wherein the data from the shadow memory is at least one of data for oscillator trimming, bandwidth selection and frequency response adjustment of digital filters, fault masking or data for selection of a communication protocol.

8. A method, comprising:
   receiving data from a non-volatile memory;
   determining a first signature of the received data from the non-volatile memory;
   storing the first signature;
   receiving data from a shadow memory, wherein the shadow memory mirrors the non-volatile memory;
   determining a second signature from the received data from the shadow memory;
   comparing the first signature to the second signature; and
   sending at least one of an error message or a command to reload the shadow memory with data from the non-volatile memory in response to the first signature and the second signature being different.

9. The method of claim 8, further comprising enabling a multiplexor to send data from the non-volatile memory to a shift register.

10. The method of claim 8, further comprising enabling the multiplexor to switch from sending the data from the non-volatile memory to sending the data from the shadowed memory to the shift register.

11. The method of claim 9, wherein enabling a multiplexor to send data from the non-volatile memory to the shift register comprises enabling the multiplexor to send data from an electrically erasable programmable read-only memory (EEPROM) to a multiple input shift register (MISR).

12. The method of claim 8, wherein sending at least one of an error message or a command to reload the shadow memory with data from the non-volatile memory in response to the first signature and the second signature being different comprises:
   sending an error flag to a first controller; and
   sending a command to reload the shadow memory to a second controller from the first controller in response to receiving the error flag, wherein the second controller copies data from the non-volatile memory to the shadow memory in response to receiving the command.

13. The method of claim 8, wherein receiving data from the shadow memory comprises receiving data from a volatile memory.

14. An article comprising:
   a processor; and
   a non-transitory machine-readable medium that stores executable instructions, the instructions causing the processor to:
   receive data from a non-volatile memory;
   determine a first signature of the received data from the non-volatile memory;
   store the first signature;
   receive data from a shadow memory, wherein the shadow memory mirrors the non-volatile memory;
   determine a second signature from the received data from the shadow memory;
   compare the first signature to the second signature; and
   send at least one of an error message or a command to reload the shadow memory with data from the non-volatile memory in response to the first signature and the second signature being different.

15. The article of claim 14, further comprising instructions causing the processor to enable a multiplexor to send data from the non-volatile memory to a shift register.

16. The article of claim 15, wherein the instructions to enable a multiplexor to send data from the non-volatile memory to the shift register comprises instructions to enable the multiplexor to send data from an electrically erasable programmable read-only memory (EEPROM) to a multiple input shift register (MISR).

17. The article of claim 14, wherein the instructions to send at least one of an error message or a command to reload the shadow memory with data from the non-volatile memory in response to the first signature and the second signature being different comprises instructions to:
   send an error flag to a first controller; and
   send a command to reload the shadow memory to a second controller from the first controller in response to receiving the error flag, wherein the second controller copies data from the non-volatile memory to the shadow memory.

18. The article of claim 14, wherein the shadow memory is a volatile memory.

19. An integrated circuit (IC) comprising:
a multiplexor configured to receive data from a non-volatile memory and configured to receive data from a shadow memory, wherein the shadow memory mirrors a non-volatile memory;
a shift register configured to generate a first signature from the data received from the non-volatile memory and configured to generate a second signature from the data received from the shadow memory;
a signature storage configured to store the first signature;
a shadow memory checking controller configured to:
  enable the multiplexor to send the data from the non-volatile memory to the shift register; and
  send a command to reload the shadow memory with data from the non-volatile memory in response to receiving an error flag; and
a comparator circuit configured to compare the first signature and the second signature and configured to send the error flag in response to the first signature and the second signature being different,
wherein the non-volatile memory is an electrically erasable programmable read-only memory (EEPROM), and the shadow memory is a volatile memory.

20. The IC of claim 19, wherein the shift register is a multiple input shift register (MISR),
wherein the shadow memory checking controller is further configured to enable the multiplexor to switch from sending the data from the non-volatile memory to sending the data from the shadowed memory to the shift register,
wherein the data from the shadow memory is at least one of data for oscillator trimming, bandwidth selection and frequency response adjustment of digital filters, fault masking or data for selection of a communication protocol.

21. The IC of claim 20, further comprising a memory controller configured to receive the command to reload the shadow memory and to reload the shadow memory with data from the non-volatile memory in response to receiving the command.

\* \* \* \* \*

UNITED STATES PATENT AND TRADEMARK OFFICE
CERTIFICATE OF CORRECTION

PATENT NO. : 11,055,165 B2
APPLICATION NO. : 16/695968
DATED : July 6, 2021
INVENTOR(S) : Nicolas Rigoni et al.

It is certified that error appears in the above-identified patent and that said Letters Patent is hereby corrected as shown below:

In the Specification

Column 1, Line 52, delete "memory determine" and replace with --memory; determine--.

Column 2, Line 35, delete "126, as" and replace with --126, a--.

Column 3, Line 49, delete "blocks 240" and replace with --block 240--.

Column 4, Line 35, delete "computers at" and replace with --computers, at--.

Column 4, Line 48, delete "include but" and replace with --include, but--.

Column 4, Line 49, delete "limited to" and replace with --limited, to--.

Column 4, Line 67, delete "include" and replace with --includes--.

Signed and Sealed this
Twelfth Day of July, 2022

Katherine Kelly Vidal
*Director of the United States Patent and Trademark Office*